United States Patent [19]

Saito et al.

[11] 4,398,699

[45] Aug. 16, 1983

[54] DEVICE FOR REMOVING FUSED SLAGS ON SLABS

[75] Inventors: Sadayuki Saito, Inba; Ichiro Fukunaga, Chiba; Susumu Ito, Chiba; Katsumi Nakamura, Chiba; Kazuya Higuchi, Ichihara, all of Japan

[73] Assignee: Kawasaki Steel Corporation, Hyogo, Japan

[21] Appl. No.: 395,006

[22] PCT Filed: Nov. 11, 1981

[86] PCT No.: PCT/JP81/00327

§ 371 Date: Jun. 29, 1982

§ 102(e) Date: Jun. 29, 1982

[30] Foreign Application Priority Data

Nov. 11, 1980 [JP] Japan ............................. 55-161319
Nov. 18, 1980 [JP] Japan ............................. 55-165141
May 29, 1982 [JP] Japan ............................. 56-81162

[51] Int. Cl.³ ............................................. B23K 7/02
[52] U.S. Cl. ................................... 266/50; 83/862; 83/869
[58] Field of Search ..................... 266/50; 83/862, 869

[56] References Cited

U.S. PATENT DOCUMENTS 3,767,178 10/1978 Pfeuffer et al. ................. 266/50
4,329,187 5/1982 Ushioda et al. ................. 266/50

Primary Examiner—W. Stallard
Attorney, Agent, or Firm—Koda and Androlia

[57] ABSTRACT

This invention relates to a device for removing fused slags on slabs wherein <-shaped cutters with the front center thereof being the apex are disposed on the front and rear positions of a tool rest being vertically movable with a required spacing and being close to the undersurface of the slab, respectively. At least the rear cutter is biased upwardly by a spring mounted in the lower portion of the tool rest. At the same time the shear point in the rear cutter is made to be somewhat higher than that of the front cutter in order to cut out the fused slags deposited on the undersurface of the slab on a transferring roller table with a prescribed length. If it is arranged in such a way that a water-cooling means for water-cooling the deposited portion of the fused dross is disposed before and behind the above device for removing fused slags on slabs, respectively, to cut off the cured dross, the fused slags can more effectively be removed.

6 Claims, 15 Drawing Figures

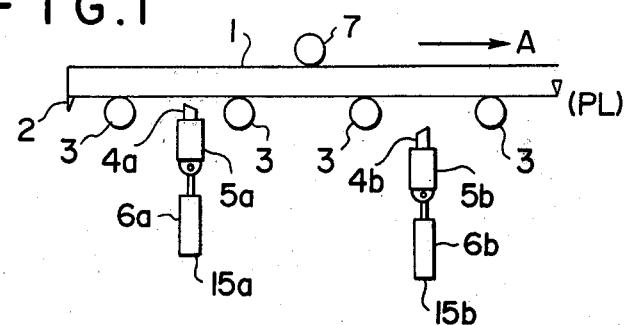
FIG.1
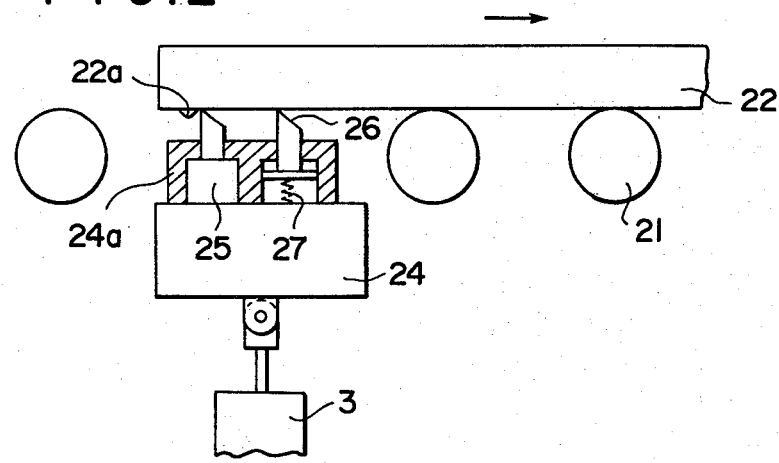
FIG.2
FIG.3  FIG.4  FIG.5
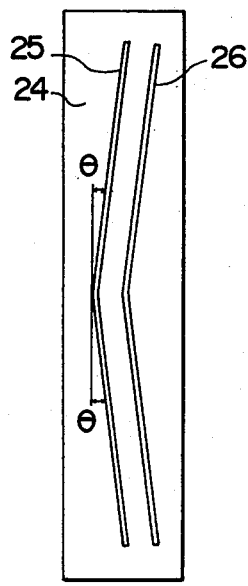
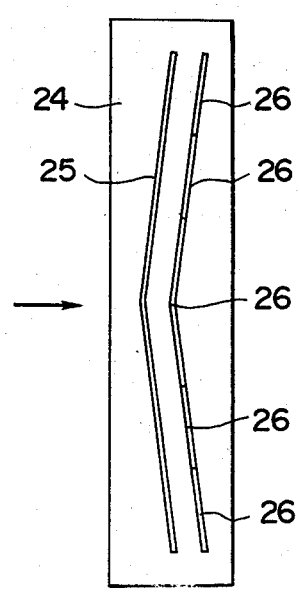
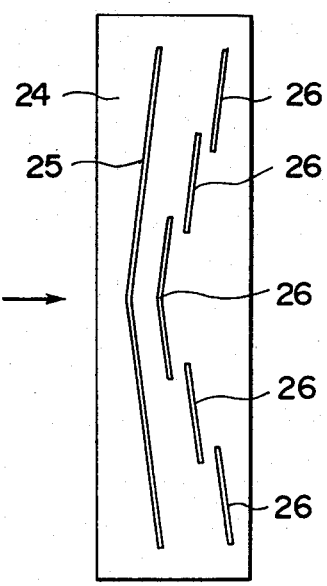

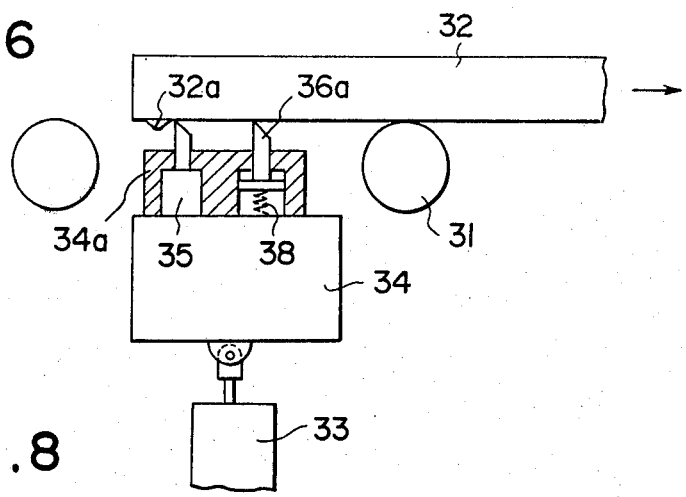
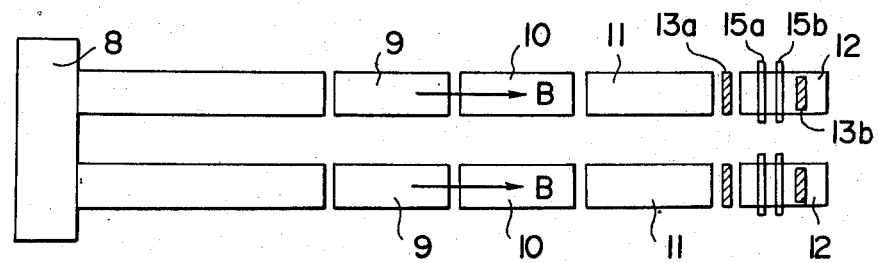
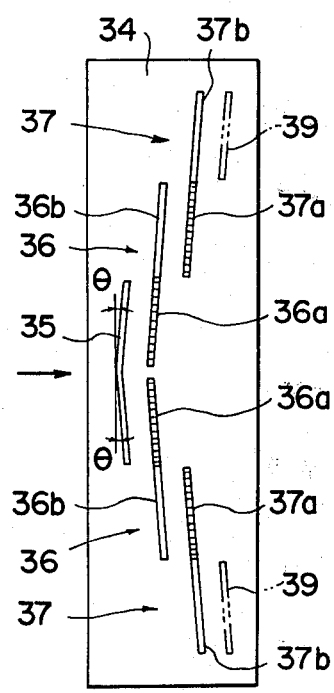
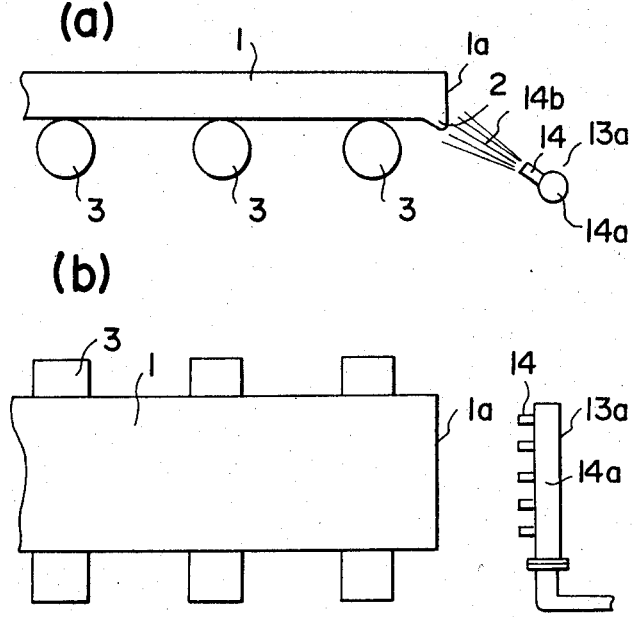

DEVICE FOR REMOVING FUSED SLAGS ON SLABS

TECHNICAL FIELD

The present invention relates to a device for cutting off and removing fused slags deposited on the undersurface of a slab produced when strip steel stocks shaped by means of continuous casting facilities and the like are fusion-cut to prepare a slab of a prescribed length by the use of a torch.

TECHNICAL BACKGROUND

For example, belt-shaped steel stock produced by means of continuous casting facilities are usually fusion-cut to obtain a slab having a prescribed length. In this case, fused slags produced at the time of cutting out a slab are deposited on the undersurface of the slab so that so-called torch dross is formed on such slab.

If a slab on which fused slags are deposited is subjected to hot rolling with the fused slags, there arise intrusive flaws by means of rolling rollers, and lamination flaws on the surface of rolled products and the like, and therefore it is required to remove such fused slags in the transferring process of the slab.

Conventional methods for removing such fused slags as mentioned above are divided broadly into two categories, i.e., a method for blowing off molten slags in accordance with scarfing and a method for cutting slags off by means of cutters. Relating to the latter method, a device for cutting off slags by the use of cutters is disclosed in, for example, Japanese Utility Model Laid-open No. 64139/1979.

The device described in the above Utility Model application is constructed in such a manner that respective cutters are divergently placed on from the front center to the rear opposite sides of a tool rest being vertically movable by means of a fluid pressure cylinder with each required angle with respect to the advancing direction as well as with each required spacing. At the same time these cutters are divergently arranged towards the rear of the tool rest so as to overlap an end portion of each cutter with that of the cutter adjacent thereto, and projection levels of the respective cutters are gradually lowered from the cutter disposed on the central part of the tool rest towards the cutters disposed on divergent opposite sides of the tool rest.

However, the device as set forth above has a disadvantage in that since the respective cutters are arranged as mentioned above, if end portions of a slab to be processed are warped widthwise, fused slags on the warped portions cannot sufficiently be cut out. Besides there is also such a disadvantage in that at the time when a cutter abuts against a slab to be processed, large impact force is applied to the cutter so that life of such cutter is shortened.

SUMMARY OF THE INVENTION

Accordingly, an object of the present invention is to provide a device for removing fused dross by which disadvantages involved in the conventional art as mentioned above, can be eliminated, In the present invention the slab is successively cut at every part thereof in accordance with an angle of sweepback of the cutters, thereby to reduce the impulsive force which acts on the cutters so that the life thereof can be prolonged. Also, where a slab is warped widthwise, fused slags can smoothly and positively be cut out successively over the whole width of the slab in a step-by-step manner.

The characteristic features of the present first invention resides in that <-shaped front and rear cutters with a front center thereof being the apex of said <-shaped cutters and disposed front and rear positions of a tool rest with the apex facing in a direction opposite to the transfer direction, respectively, at least a spring mounted in the tool rest for biasing the rear cutter in an upward direction, and a shear point of the rear cutter projects higher than that of the front cutter.

Another mode of the present first invention is that a <-shaped stationary front cutter with the center thereof as the apex, middle cutters each consisting of a cutter part biased by a spring disposed with a required spacing from the front cutter and overlapping with the front cutter and each stationary cutter part placed adjacent to the outside of the middle cutter part, and rear cutters each consisting of a cutter part biased by a spring disposed similarly to that of the middle cutters and overlapping with the stationary cutter part positioned before the middle cutter part and each stationary cutter part placed adjacent to the outside of the middle cutter part are provided on a tool rest being vertically movable, respectively, and the shear point in the middle cutter part is made to be somewhat higher than that of each stationary cutter part.

One one hand, heretofore, removal of fused dross on a continuously cast slab or the like after cutting off the same has usually been carried out by a manner as illustrated in FIG. 1. Namely, FIG. 1 is an explanatory view illustrating a method for removing fused dross according to a conventional example in which a slab 1 after it was cut off is transferred on a transferring table consisting of a plurality of table rollers 3 in a direction indicated by an arrow A as shown in FIG. 1. On the undersurface in a cut-off part of the slab 1, fused dross 2 have been deposited, and to remove such fused dross, cutters 4 for removing fused dross are provided usually below the path line (pL) in a vertically movable manner. And when the slab 1 on which the fused dross 2 is deposited is transferred to a prescribed position, the cutter 4 for removing fused dross is raised simultaneously with a cutter pedestal 5 by means of a cylinder 6 to urge and abut the cutter 4 for removing fused dross upon the undersurface of the slab 1, whilst a pinch roll 7 contacts with the surface of the slab 1 so that the fused dross 2 is sheared and removed. After completion of shearing and removing of the fused dross, the cutter 4 for removing fused dross is lowered by means of the cylinder 6 and the cutter 4 returns to a position below the path line (pL). In FIG. 1 it is to be noted that two removal means for fused dross are provided, since the fused dross is deposited on the undersurface in both the front and rear ends of a slab. However, when fused dross is removed by such a manner as described above and since a surface temperature of the slab 1 in the end face thereof at the time of removing the fused dross is generally a high temperature such as 700° C. and higher, the fused dross cannot completely be removed due to tack resistance or the like of the slab. Furthermore, when the removal of fused dross is incomplete, the unremoved portion is transferred to the following step as it is so that when such slab is rolled to obtain a product, the unremoved portion remains as flaws in the product. Therefore such defective parts are ordinarily cut off and removed. As a result, there arise such problems as dropping of the yield and the like. Under the circumstance, the existence of such fused dross is generally detected in a transferring step of the slabs so that if an unremoved portion is found, removal of the fused dross is again carried out in accordance with any manner before such slab is rolled.

As mentioned above, in a conventional example, fused dross of a slab has been subjected to a removal process of fused dross when the surface of the slab is at a high temperature so that the fused dross can not be completely removed. For this reason, it has been required to detect the existence of fused dross in the transferring process of slabs. Moreover processes for handling slabs have been disrupted according to the frequency of rejected product.

Accordingly, an object of a second embodiment of the present invention is to eliminate the disadvantages as described above, and specifically to provide a method for removing fused dross on slabs. In the second embodiment a device therefor is provided in which a deposited portion of the fused dross is previously water-cooled and then; the fused dross is easily and completely removed, hence, unlike conventional examples there is no need of any detection for the existence of fused dross in its transferring step and results in a reduction of the frequency of flaws in the products after such slabs are rolled.

Namely, the second embodiment of the present invention is characterized by subjecting a slab such as a continuously cast slab or the like to continuous gas cutting on a hot slab transferring table, thereafter water-cooling a deposited portion of the fused dross on the undersurface of the slab in the cut-off portion thereof, adjusting a temperature at the end face of the aforesaid slab in the aforesaid deposited portion of the fused dross to 650° C. or less, and then shearing and removing the dross.

Furthermore the second embodiment of the present invention is characterized, as another mode thereof, in that a gas cutting means for subjecting a slab such as a continuously cast slab or the like to continuous gas cutting on a hot slab transferring table line is followed by a shearing and removing means for cutting out the fused dross deposited on the undersurface of the slab in the cut-off portion thereof, and water-cooling means for water-cooling the deposited portion of the fused drops on the slab are disposed before and behind the shearing and removing means for the fused dross, respectively, whereby the device is arranged such that the fused dross is sheared and removed by means of the shearing and removing means.

BRIEF DESCRIPTION OF THE DRAWINGS

FIG. 1 is an explanatory view illustrating a method for removing fused dross according to a conventional example;

FIG. 2 is a schematic side view illustrating an example of a device in accordance with the present invention;

FIG. 3 is a schematic planar view showing an arrangement of cutters on a tool rest;

FIGS. 4 and 5 are schematic planar views each showing another example of the arrangement of cutters on a tool rest;

FIG. 6 is a schematic side view illustrating another mode of the present invention;

FIG. 7 is a schematic planar view showing an arrangement of cutters on a tool rest;

FIG. 8 is a schematic layout illustrating an example of a device for embodying a second embodiment of the present invention;

FIGS. 9(a) and 9(b) are side and planar views showing an example of a water-cooling device, respectively;

THE MOST PREFERRED MODES FOR EMBODYING THE INVENTION

Figure 10:
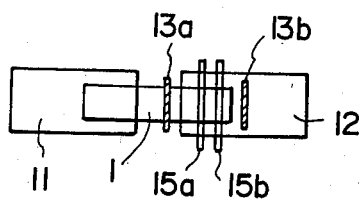
FIGS. 10, 11, 12 and 13 are explanatory views illustrating respective processes in case of removing fused dross according to the second embodiment of the present invention.
Figure 11:
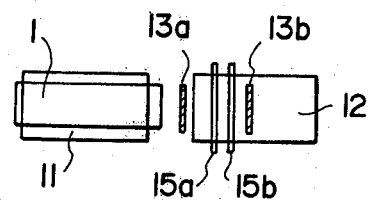
Figure 12:
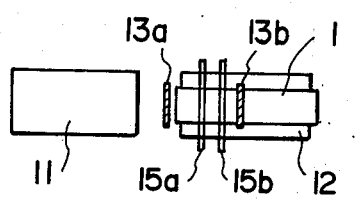

The embodiments of the present invention will be described hereinbelow by referring to the accompanying drawings in which FIGS. 2–5 illustrate the embodiments of the present first invention, respectively.

In FIG. 2, reference numeral 21 designates a roller table for transferring a slab 22 of a prescribed length to, for example, a hot mill, and at the lower part, being an optional position between the rollers, of the roller table 21, a tool rest 24 being moved vertically by means of a fluid pressure cylinder 23 which is disposed perpendicularly to the roller table 21.

Furthermore, as shown also in FIG. 3, on the top of the tool rest 24, a cutter 25 having, e.g., a <-shape section in the plane and being formed such that the front (the inlet side of the slab 22) center thereof is the apex and which diverges continuously towards the opposite ends of the cutter with an angle $\theta$ of sweepback of, for instance, around 3–10 degrees, preferably around 5 degrees, is fixed and held such that the shear point of the cutter is placed with the face upward by means of a holder 24a secured to the tool rest 24.

At the rear position (the outlet side position of the slab 22) of the cutter 25, another cutter 26 having the same shape as that of the cutter 25 and being arranged to have a required spacing with respect to the cutter 25, preferably in parallel, is maintained such that the shear point of the cutter 26 is positioned with the face upward by means of the holder 24a. Moreover a suitable abutting force is given to maintain the cutter 26 with respect to the undersurface of the slab 22 by means of a spring 27 installed on the lower part of and inside the holder 24a.

The shear point of the cutter 26 is set higher than that of the front cutter 25 by, for example, around 3–5 mm. Accordingly, when the slab 22 to be processed is warped in the width direction, these cutters are arranged in such that the shear point of the rear cutter 26 abuts against the undersurface of the slab 22, whereby a fused slag 22a on the undersurface of the slab 22 can be cut out, even if the shear point of the front cutter 25 does not abut against the bottom of the slab 22.

In addition, another spring may also be installed on the undersurface of the front cutter 25.

Furthermore it is preferably that the rear cutter 26 is divided into plural parts as shown in FIG. 4, and springs are installed on the bottom of the divided cutters 26, respectively, whereby these cutters are made to sufficiently cope with the widthwise or lengthwise warp of the slab 22. In this case, it is desirable to make each shear point of the divided cutters 26 higher by several mm.

As an alternative example for dividing the rear cutter 26, the divided cutters may be arranged such that they are successively shifted rearwardly from that positioned innermost to those positioned outermost as shown in FIG. 5.

As a matter of course, the device according to the present invention can also be applied to the case where scales on the top and bottom faces as well as both of the side faces of the slab 22 are removed. In this case, it may be arranged such that two pairs of the tool rests 24 each provided with the cutters 25 and 26 are placed opposite to one another on the top and bottom faces as well as both the side faces of the slab 22, respectively.

Moreover, since the roller table 21 for transferring the slab 22 is rotated and controlled in normal and reverse directions of the roller table to reciprocate the slab 22 for removing fused slags or scales, the tool rests each provided with the cutters 25 and 26 are disposed on the front and rear positions in the advancing direction of the slab 22 symmetrically to each other with a required spacing.

The present first invention is composed, as mentioned above, such that in order to cut out fused slags on a slab in the transferring process of the the slab of a prescribed length, <-shaped cutters with a front center thereof being the apex are disposed on the front and rear positions of a tool rest and are vertically movable with a required spacing; and respectively, at least the rear cutter is maintained at a lower position with respect to the tool rest through a spring, and at the same time the the shear point of the rear cutter is made to be somewhat higher than that of the front cutter. Accordingly there is not such fear that fused slags extending over all the region in the widthwise direction of the undersurface of the slab are cut out at the same time by means of both the cutters, and the slab can be successively cut out at every part in accordance with the angle of sweepback of the cutters. Therefore it does not occur that a large impulsive force is applied to the cutters so that the life of the cutters can be prolonged.

Furthermore, in the case where a slab is warped widthwise, such fused slags which could not be cut out by means of the front cutter can smoothly and positively cut out by means of the rear cutter.

FIGS. 6 and 7 are views for illustrating another embodiment of the present invention, respectively.

In FIG. 6, reference numeral 31 designates a roller table for transferring a slab 32 fused with a prescribed length to, for example, a hot mill; and at the lower part, being an optional position between the rollers, of the roller table 31, a tool rest being moved vertically by means of a fluid pressure cylinder 33 is disposed perpendicularly to the roller table 31.

Furthermore, as shown also in FIG. 7, on the top of the tool rest 34, a front cutter 35 having, e.g., a <-shape section in the plane and being formed such that the front (the inlet side of the slab 32) center thereof the apex and which diverges towards the opposite ends of the cutter with an angle $\theta$ of sweepback of, for instance, around 3–10 degrees, preferably around 5 degrees if fixed, and held such that the shear point of the cutter is placed with the face upward by means of a holder 34a secured to the tool rest 34.

In addition, middle and rear cutters 36 and 37 being arranged so as to have a required spacing with respect to the front cutter 35, preferably in parallel thereto, respectively, and which diverge successively towards the opposite ends of the front cutter in the rear direction thereof while these middle and rear cutters which are overlapped with each other are positioned with the face upward by means of the holder 34a.

Among the middle and rear cutters 36 and 37, parts of cutters 36a and 37a overlapping with their own front cutters, respectively, are maintained by receiving a suitable abutting force on the undersurface of the slab 32 by means of a spring 38 installed on the lower part of and inside the holder 34a, respectively.

In respect to the shear points of the cutter parts 36a and 37a in the respective middle and rear cutters on which the spring 38 is installed, the shear point of a cutter positioned before another cutter, e.g., the shear point of the cutter part 36a is set higher than that of the front cutter 35 by, for instance, around 3–5 mm, and further the shear point of the cutter part 37a is set higher than that of a stationary cutter part 36b of the cutter 36 in by, for example, around 3–5 mm. Accordingly, when the slab 32 to be processed is warped widthwise, these cutters are arranged such that the shear points of the rear cutter parts 36a and 37a abut against the undersurface of the slab 32, whereby a fused slag 32a on the undersurface of the slab 32 can be cut out, even if the shear point of the front cutter does not abut against the bottom of the slab 32.

As illustrated in FIG. 7 by means of dot and dash lines, cutters 39 to each of which a spring 38 is provided may be disposed behind the stationary cutter parts 37b of the rear cutters 37 with a required spacing, preferably in parallel to each other.

Furthermore, it is preferable that the cutter parts 36a and 37a (also the cutters 39) provided with springs 38, respectively, are divided into plural parts in order to sufficiently cope with variations in warp of the slab 32.

As a matter of course, the device according to this embodiment can also be applied to the case where scales on the top and bottom faces as well as both the side faces of the slab 32 are removed. In this case, it may be arranged such that two pairs of the tool rests 34 each provided with the respective cutters 35, 36, 37 and the like are placed opposite to one another on the top and bottom faces as well as both the side faces of the slab 32, respectively.

Moreover, since the roller table 31 for transferring the slab 32 is rotated and controlled in normal and reverse directions of the roller table to reciprocate the slab 32 for removing fused slags or scales, the tool rests each provided with the cutters 35, 36, 37 and the like are disposed on the front and rear positions in the advancing direction of the slab 32 symmetrically to each other with a required spacing.

The present embodiment is composed, as set forth above, such that in order to cut out fused slags on a slab in the transferring process of the slab of a prescribed length, a <-shaped stationary front cutter with the front center thereof being the apex; middle cutters each consisting of a cutter part provided a spring disposed with a required spacing from the front cutter and overlapping with the front cutter and each stationary cutter part placed adjacent to the outside of the cutter part; and rear cutters each consisting of a cutter part provided with a spring disposed similarly to that of the middle cutters and overlapping with the stationary cutter part positioned before the cutter part and each stationary cutter part placed adjacent to the outside of the cutter part having a spring are provided on a tool rest being vertically movable, respectively, and projection level of the shear points, in the cutter part having a spring is made to be somewhat higher than that of each stationary cutter part positioned before this cutter part. Accordingly, there is not such fear that fused slags extending over all the region in the widthwise direction of the undersurface of the slab are cut out at the same time by means of these cutters, but the slab can successively be cut out at every part in accordance with the angle of sweepback of the cutters. Therefore a large impulsive force is not applied to the cutters so that the life of the same can be prolonged.

Furthermore, when a slab is warped widthwise, such fused slags which could not be cut out by means of the front cutter can smoothly and positively be cut out successively in a step-by-step manner by means of cutter parts overlapping with those positioned before the same among the middle and rear cutters.

FIGS. 8-14 are views for illustrating a second embodiment of the present invention, respectively.

First, FIG. 8 is a schematic layout showing an example of the device for embodying the second embodiment of the present invention in which slabs such as continuous cast pieces and the like are continuously cast by means of a continuous casting machine 8, and such slabs are continuously cut off by means of each gas cutting apparatus (not shown) in each table 9 by a torch. Each slab after cutting off the same is transferred to each of transferring tables 11 and 12 from each torch delivery table 10, and such slab is transferred in a direction indicated by an arrow B by means of each of the transferring tables 11 and 12.

Next, in these transferring tables 11 and 12, means 15a and 15b for shearing and removing fused dross are provided in order to eliminate the fused dross of the slab after it was cut off, and water cooling means 13a and 13b are disposed before and behind the shearing and removing means 15a and 15b for fused dross, respectively. Such shearing and removing means 15a and 15b for fused dross may be composed in any type of a means so far as the means is constructed such that fused dross on the undersurface of a slab can be sheared to remove the fused dross in the cut portion of the slab. In general, however, as shown in FIG. 1, it is sufficient if a pedestal 5 for supporting a cutter 4 for removing fused dross in the lower part of a path line is constructed so as to freely ascend and descend by means of a cylinder 6. Furthermore, each of the water cooling means 13a and 13b may be constructed as any type of a means so long as the means can cool a fused dross deposited portion down to 650° C. or less in the cut portion of a slab, but usually it is preferable to compose the means as shown in FIGS. 9(a) and 9(b).

Namely, FIGS. 9(a) and 9(b) are a side view and a planar view each showing an example of a water cooling means in which a plurality of sprinkler nozzles 14 are opposed to a cut-off portion 1a of a slab 1 transferred by means of each table roller 3 in a transferring table, and the sprinkler nozzles 14 are arranged such that cooling water can be supplied thereto through a header 14a. By such arrangement, the cooling water 14b is sprayed from each sprinkler nozzles 14 so that the fused dross 2 is instantly cooled. Furthermore the respective sprinker nozzles 14 may also be constructed such that they are interlocked with a detecting means for a slab section (not shown), for instance, a photoelectric tube or the like, and when it is detected that a slab end face stops in place by means of the detecting means, the cooling water can be sprayed.

In addition, as a result of various experiments in case of removing fused dross, it became clear that since a slab was at a high temperature, the fused dross could not completely be removed because of its tack resistance. In this respect, the end face of the slab on which the fused dross is deposited is cooled by spraying water thereonto and consequently, it has turned out that when a temperature at the slab end face is made to be 650° C. or less as shown in FIG. 8, the fused dross can be substantially completely sheared and removed.

Therefore, in order to completely remove such dross, when the end face of a slab on which the fused dross is deposited is cooled to a temperature of 500°-200° C., it becomes possible to keep an end face temperature at the time of removing the dross at 650° C. or less, whereby the dross can completely be removed.

Figure 13:
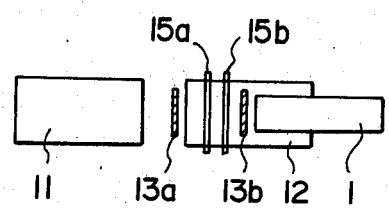
Figure 14:
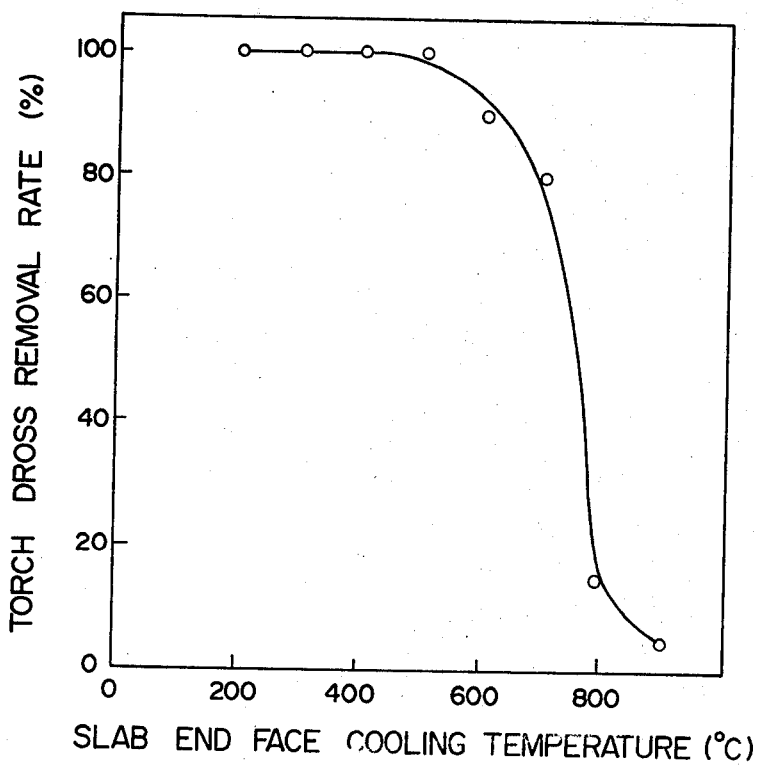
FIG. 14 is a graphical representation illustrating a relationship between a temperature in a slab end face and a dross removal rate.

Now, a case where the fused dross on a slab after it was subjected to gas cutting is removed will be described hereinbelow through operational modes of a device for removing fused dross constructed as described above. First, the slab 1 after completing gas cutting is transferred to the transferring table 12 by way of the torch delivery table 10 and the transferring table 11, and the slab is stopped on the transferring table 12 in a situation shown in FIG. 10. Thereafter cooling water is jetted from each sprinkler nozzle 14 of the water cooling means 13b for around 5-20 seconds so that the extreme end of the slab 1 is cooled to 650° C. or less. After the extreme end of the slab 1 is cooled by means of the water cooling means 13b, the slab is backwardly fed on the tables, the dross on the extreme end thereof is cut out by means of the shearing and removing means 15b. The slab is continued to be backwardly fed, and then the slab is stopped at a position illustrated in FIG. 11. Thereafter the slab 1 is again transferred in the direction B, the slab then stops in a condition illustrated in FIG. 12, and the rear end portion of the slab is sprayed by the water cooling device 13a this time to effect cooling thereof. After completing the cooling of the rear end portion of the slab, the slab 1 is again transferred along the direction B, the dross on the rear end portion is removed by means of the shearing and removing means 15a, the slab comes to be in a state as illustrated in FIG. 13, and then the resulting slab is transferred to the following steps.

Since the dross portions are sheared and removed after cooling them by way of the above respective steps in second embodiment of the present invention, such dross portions can completely be removed so that there is no trouble in the treatment in the following steps.

If the cooling before shearing and removing of slabs is carried out by such manner that a temperature of the slab end face comes to be within a range of 500°-200° C., the slab end face at the time of removing the dross may be cooled so as to be kept at a temperature 650° C. or less.

As described above in detail, the second embodiment of the present invention relates to a method in which before the fused dross on a slab is sheared and removed by means of cutters and the like, the fused dross is cooled to make the dross portion brittle by which such portion is easily sheared, and then the shearing and removing operations are carried out. As the result, the fused dross can completely be removed by such method as stated above. Thus, there are no flaws and the like on a product when the billet after it was cut off is rolled in the following step. In addition there is no need to detect for the existence of fused dross in the transferring step, and there is also no fear of causing any trouble in the other processes.

INDUSTRIAL APPLICABILITY

As mentioned above, the device for removing fused slags on slabs according to the present invention is sutable for the installation in steps for processing slabs in an ironwarks as a device for cutting off and removing fused slags on a slab which is obtained by fusing a strip steel stock fed from continuous casting facilities and the like to a prescribed length by means of a torch or the like.

We claim:

1. A device for removing fused slags on slabs as said slabs are transferred in a transferring direction, comprising:
    a tool rest which is movable in an upward direction perpendicular to said transferring direction;
    at least a front and rear <-shaped cutters with a center of said front and rear <shaped cutter being the apex of said < and disposed in front and rear positions of said tool rest with said apex facing in a direction opposite to said transferring direction;
    at least a spring mounted in said tool rest for biasing said rear cutter in said upward direction; and
    a shear point of said rear cutter projects upwardly somewhat higher than that of the front cutter in order to cut out the fused slags on said slab during the transferring process of the slab of a predetermined length.

2. A device for removing fused slags on slabs as claimed in claim 1, characterized in that said rear cutter is divided into plural parts, and a spring is interposed between the under surface of each plural part and said tool rest.

3. A device for removing fused slags on slabs as claimed in claim 1, further characterized in that said rear cutter is divided into plural parts and said plural parts are arranged such that they are successively shifted rearwardly from an innermost position to an outermost position, and a spring is interposed between the undersurface of each plural part and said tool rest.

4. A device for removing fused slags on slabs, characterized in that a <-shaped stationary front cutter shaping the front center thereof being the inlet side for a slab as the apex; middle cutters each consisting of a cutter part installing a spring disposed with a required spacing from said front cutter and lapping over with said front cutter and each stationary cutter part placed adjacent to the outside of said cutter part installing a spring; and rear cutters each consisting of a cutter part installing a spring disposed similarly to that of said middle cutters and lapping over with the stationary cutter part positioned before said cutter part one another and each stationary cutter part placed adjacent to the outside of said cutter part installing a spring are provided on a tool rest being vertically movable, respectively; and each projection level of the share point in a cutter part installing a spring is made to be somewhat higher than that of each stationary cutter part positioned before the very cutter part in order to cut out the fused slags on said slab in the transferring of the slab of a prescribed length.

5. A method for removing fused dross on slabs comprising subjecting a slab such as a continously cast slab or the like to continuous gas cutting on a hot slab transferring table; thereafter water-cooling a deposited portion of the fused dross on the undersurface of said slab in the cut-off portion thereof; adjusting a temperature at the end face of said slab in said deposited portion of the fused dross to 650° C. or less; and then shearing and removing said fused dross.

6. A device for removing fused dross on slabs, characterized in that a gas cutting means for subjecting a slab such as a continuously cast slab or the like to continuous gas cutting on a hot slab transferring table line is followed by a shearing and removing means for cutting out the fused dross deposited on the undersurface of said slab in the cut-off portion thereof; and water-cooling means for water-cooling said deposited portion on the fused dross on said slab are disposed before and behind said shearing and removing means for fused dross, respectively; whereby said device is arranged such that said fused dross is sheared and removed by means of said shearing and removing means.

* * * * *